(12) United States Patent
Chung et al.

(10) Patent No.: US 10,206,188 B2
(45) Date of Patent: Feb. 12, 2019

(54) METHOD AND APPARATUS FOR TRANSMITTING SYNCHRONIZATION SIGNAL IN MOBILE COMMUNICATION SYSTEM

(71) Applicant: Electronics and Telecommunications Research Institute, Daejeon (KR)

(72) Inventors: Hee Sang Chung, Daejeon (KR); Il Gyu Kim, Chungcheongbuk-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 81 days.

(21) Appl. No.: 14/991,077

(22) Filed: Jan. 8, 2016

(65) Prior Publication Data

US 2016/0205646 A1  Jul. 14, 2016

(30) Foreign Application Priority Data

Jan. 8, 2015 (KR) .................. 10-2015-0002832
Jan. 7, 2016 (KR) .................. 10-2016-0002052

(51) Int. Cl.
*H04W 56/00* (2009.01)
*H04W 72/04* (2009.01)
(Continued)

(52) U.S. Cl.
CPC ......... *H04W 56/001* (2013.01); *H04L 5/0053* (2013.01); *H04W 72/0446* (2013.01); *H04L 5/0048* (2013.01); *H04W 28/26* (2013.01)

(58) Field of Classification Search
CPC ............... H04W 48/16; H04W 56/001; H04W 72/0446; H04W 28/26; H04L 5/0053; H04L 5/0048
See application file for complete search history.

(56) References Cited

U.S. PATENT DOCUMENTS 8,509,267 B2  8/2013 Kim et al.
2010/0061322 A1  3/2010 Kim et al.
(Continued)

FOREIGN PATENT DOCUMENTS

KR  1020120009913 A  2/2012

OTHER PUBLICATIONS

Il Gyu Kim et al., "Neighbor Cell Search Scheme using Partial Interference Cancellation of Primary Synchronization Code," The 5th CDMA International Conference & Exhibition PROCD. V.2, Nov. 2000, pp. 1-16.
(Continued)

*Primary Examiner* — Ayaz R Sheikh
*Assistant Examiner* — Hai-Chang Hsiung
(74) *Attorney, Agent, or Firm* — William Park & Associates Ltd.

(57) ABSTRACT

A base station in a mobile communication system determines the number of slots that are to be used to transmit a synchronization signal in a period of the synchronization signal depending on the number of neighbor cells, allocates a synchronization signal region in which the synchronization signal is to be transmitted to a first slot of the determined number of slots depending on a cell identifier of a serving cell, and allocates a reserved region in which no signal is transmitted to slots other than the first slot among the determined number of slots so as to correspond to a position of the synchronization signal region.

7 Claims, 12 Drawing Sheets

(51) Int. Cl.
*H04L 5/00* (2006.01)
*H04W 28/26* (2009.01)

(56) References Cited

U.S. PATENT DOCUMENTS

| | | | | |
|---|---|---|---|---|
| 2010/0182903 | A1* | 7/2010 | Palanki | H04L 1/0041 |
| | | | | 370/225 |
| 2012/0122453 | A1 | 5/2012 | Shin et al. | |
| 2013/0201884 | A1* | 8/2013 | Freda | H04W 72/005 |
| | | | | 370/278 |
| 2014/0140337 | A1* | 5/2014 | Seo | H04W 56/00 |
| | | | | 370/350 |
| 2014/0269455 | A1 | 9/2014 | Etri | |
| 2015/0092582 | A1* | 4/2015 | Liao | H04J 11/005 |
| | | | | 370/252 |
| 2016/0360463 | A1* | 12/2016 | Kim | H04B 7/0617 |

OTHER PUBLICATIONS

"Details on small cell discovery signal", 3GPP TSG-RAN WG1 #77 R1-142028, Intel Corporation, Seoul, Korea, May 19-23, 2014.
"Transmit-side Signalling Enhancements Targeting Het-Nets for Rel-11", 3GPP TSG RAN WG1 Meeting #66bis R1-113244, Texas Instruments, Zhuhai, China, Oct. 10-14, 2011.

* cited by examiner

METHOD AND APPARATUS FOR TRANSMITTING SYNCHRONIZATION SIGNAL IN MOBILE COMMUNICATION SYSTEM

CROSS-REFERENCE TO RELATED APPLICATION

This application claims priority to and the benefit of Korean Patent Application Nos. 10-2015-0002832 and 10-2016-0002052 filed in the Korean Intellectual Property Office on Jan. 8, 2015 and Jan. 7, 2016, the entire contents of which are incorporated herein by reference.

BACKGROUND OF THE INVENTION

(a) Field of the Invention

The present invention relates to a method and an apparatus for transmitting a synchronization signal in a mobile communication system. More particularly, the present invention relates to a method and an apparatus for transmitting a synchronization signal capable of facilitating a neighbor cell search in a mobile communication system.

(b) Description of the Related Art

In a mobile communication system, a terminal starts to perform a cell search including processes such as time synchronization, frequency synchronization, cell identifier obtainment, and the like, in an initial step for the purpose of communication with a base station. Then, the terminal and the base station perform communication therebetween through a random access process. A base station with which the communication is being currently performed by the terminal is called a home cell. The terminal has mobility, and may move to adjacent base station beyond a home cell area. In this case, the adjacent base stations are called neighbor cells.

The terminal measures and updates a frame starting point of the home cell, measures a signal quality and reports the measured signal quality through an uplink, and obtains information such as synchronization, power, a cell identifier, and the like, of the neighbor cells and reports the obtained information to the base station. When a neighbor cell list is created through a neighbor cell search, the base station designates a target cell to which a handover is to be performed. Therefore, the neighbor cell search in the terminal should be smoothly performed in order to enable the handover.

The neighbor cell search is a process of detecting a synchronization signal transmitted by the base station. Here, one of indices used for the neighbor cell search is a signal-to-interference and noise ratio (SINR). In the neighbor cell search process, a synchronization signal of the neighbor cell becomes a signal, and a synchronization signal of the home cell becomes interference. In a general synchronization or cell search method, a support target of an SINR is about −6 to −3 dB.

SINR=−3 dB indicates a case in which the sum of powers of interference and noise is two times the power of a signal. SINR=−6 dB indicates a case in which the sum of the interference and noise powers is four times the signal power.

However, at the time of performing the neighbor cell search, even though the terminal is present at a boundary between the cells, a case in which an SINR value is out of this range, such that it is difficult to perform the neighbor cell search may occur. There is a case in which a signal power of the home cell is continuously increased without being decreased, and is then suddenly decreased significantly, in a process in which the terminal moves from the home cell to the neighbor cell. In this case, the signal power of the home cell acts as very large interference at the time of performing the neighbor cell search, such that the terminal searches the neighbor cell at a point in time in which the signal power of the home cell is suddenly significantly decreased to perform a handover. However, when the handover is started, quality of communication with the home cell is significantly deteriorated, such that the handover may fail. Therefore, a method for successfully searching the neighbor cell even in the case in which the signal power of the home cell is very large has been required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for transmitting a synchronization signal in a mobile communication system having advantages of successfully searching a neighbor cell even in the case in which a signal power of a serving cell acts as very large interference.

An exemplary embodiment of the present invention provides a method for transmitting a synchronization signal of a base station in a mobile communication system. The method for transmitting a synchronization signal includes: determining the number of slots that are to be used to transmit the synchronization signal in a period of the synchronization signal depending on the number of neighbor cells; allocating a synchronization signal region in which the synchronization signal is to be transmitted to a first slot of the determined number of slots depending on a cell identifier of a serving cell; and allocating a reserved region in which any signal is not transmitted to slots other than the first slot among the determined number of slots so as to correspond to a position of the synchronization signal region.

Each slot may include a plurality of transmission symbols in a time domain, and the reserved region may include more transmission symbols than those of the synchronization signal region.

The reserved region further includes a first transmission symbol corresponding to a position of a transmission symbol of the synchronization signal region and at least one transmission symbol before the first transmission symbol and at least one transmission symbol after the transmission symbol.

The allocating of the synchronization signal region may include determining the first slot of a plurality of slots depending on a result obtained by performing modular arithmetic on the cell identifier by the number of neighbor cells plus 1.

The determining of the number of slots that are to be used to transmit the synchronization signal may include determining that the number of slots that are to be used to transmit the synchronization signal is the number of neighbor cells plus 1.

The method for transmitting a synchronization signal may further include transmitting the synchronization signal in the synchronization signal region.

The first slot may be a slot different from first slots of the neighbor cells.

Another exemplary embodiment of the present invention provides an apparatus for transmitting a synchronization signal of a base station in a mobile communication system. The apparatus for transmitting a synchronization signal includes a processor and a transceiver. The processor determines the number of slots that are to be used to transmit the synchronization signal among a plurality of slots in a period of the synchronization signal, allocates a synchronization signal region to one first slot of the determined number of slots, and allocates a reserved region in which no signal is transmitted to the other slots. The transceiver transmits the synchronization signal in the synchronization signal region.

The processor may determine the first slot of the determined number of slots using a cell identifier and the number of neighbor cells.

The processor may determine the first slot of the determined number of slots depending on a result obtained by performing modular arithmetic on the cell identifier by the number of neighbor cells plus 1.

The first slot may be a different slot from first slots to which a synchronization signal region is allocated in the neighbor cells among the determined number of slots.

Each slot may include a plurality of transmission symbols in a time domain, and the processor may allocate the reserved region so as to include transmission symbols more than those of the synchronization signal region.

The reserved region further includes a first transmission symbol corresponding to a position of a transmission symbol of the synchronization signal region and at least one transmission symbol before the first transmission symbol and at least one transmission symbol after the transmission symbol.

The processor may determine that the number of slots that are to be used to transmit the synchronization signal is the number of neighbor cells plus 1.

The synchronization signal may be used in order to perform a neighbor cell search in a terminal.

DETAILED DESCRIPTION OF THE EMBODIMENTS

Figure 1:
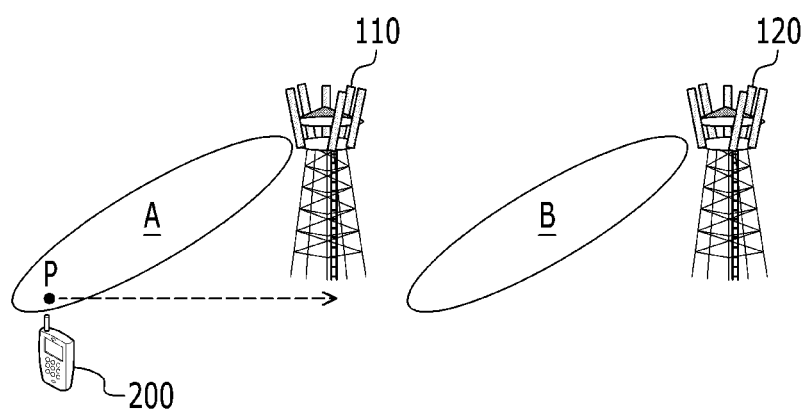
FIG. 1 is a view showing an example of a cell configuration of a mobile communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and the claims, unless explicitly described to the contrary, the word "comprise" and variations such as "comprises" or "comprising", will be understood to imply the inclusion of stated elements but not the exclusion of any other elements.

Throughout the present specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), or the like, and may include all or some of functions of the MT, the MS, the AMS, the HR-MS, the SS, the PSS, the AT, the UE, or the like.

In addition, a base station (BS) may indicate an advanced base station (ABS), a high reliability base station (HR-BS), a node B, an evolved node B, (eNodeB), an access point (AP), a radio access station (RAS), a base transceiver station (BTS), a mobile multihop relay (MMR)-BS, a relay station (RS) serving as the base station, a relay node (RN) serving as the base station, an advanced relay station (ARS) serving as the base station, a high reliability relay station (HR-RS) serving as the base station, small base stations [femto base station (femto BS), a home node B (HNB), a home eNodeB (HeNB), a pico base station (pico BS), a metro base station (metro BS), a micro base station (micro BS), and the like], or the like, and may include all or some of functions of the ABS, the node B, the eNodeB, the AP, the RAS, the BTS, the MMR-BS, the RS, the RN, the ARS, the HR-RS, the small base stations, or the like.

Next, a method and an apparatus for transmitting a synchronization signal in a mobile communication system according to an exemplary embodiment of the present invention will be described in detail with reference to the accompanying drawings.

FIG. 1 is a view showing an example of a cell configuration of a mobile communication system according to an exemplary embodiment of the present invention.

Referring to FIG. 1, the mobile communication system includes a plurality of base stations 110 and 120 and a terminal 200.

The base stations 110 and 120 provide a communication service to a terminal in a cell. The base stations 110 and 120 periodically transmit synchronization signals so that the terminal in the cell may perform a cell search.

The terminal 200 has mobility, and may move from a serving cell to an adjacent cell. In the case in which the terminal 200 is positioned in a cell of the base station 110, the terminal 200 may establish connection with the base station 110 to receive a communication service. The base station 110 with which the connection is currently established by the terminal 200 and the communication with the terminal 200 is performed is called a serving base station 110, a base station adjacent to the base station 110 is called a neighbor base station 120, a cell of the serving base station 110 is called a serving cell, and a cell of the neighbor base station 120 is called a neighbor cell.

The terminal 200 measures and updates a frame starting point of the serving cell, periodically performs a cell search for the neighbor cell, measures signal quality of the serving cell and the neighbor cell, and reports a neighbor cell list and a measurement result of the signal quality to the serving base station 110 through an uplink. As an example of the signal quality, a signal-to-interference and noise ratio (SINR), reference signal received power (RSRP), reference signal received quality (RSRQ), or the like may be used.

The terminal 200 may perform the cell search using the synchronization signal transmitted from the neighbor base station. The terminal 200 may obtain a cell identifier and signal quality using the synchronization signal transmitted from the neighbor base station. In a cell search process, the synchronization signal transmitted from the neighbor base station corresponds to a signal, the synchronization signal transmitted from the serving base station corresponds to interference, and thermal noise corresponds to noise.

The terminal 200 measures the SINR from the synchronization signal of the neighbor base station for the purpose of the cell search. In the cell search, a support target of an SINR is about −6 to −3 dB. SINR=−3 dB indicates a case in which the sum of interference and noise powers is two times the signal power, and SINR=−6 dB indicates a case in which the sum of the interference and noise powers is four times the signal power. The terminal 200 may generate a neighbor cell list on the basis of the SINR measured from the synchronization signal of the neighbor base station.

The base station 110 determines a target cell to which the terminal 200 is to be handed over on the basis of the neighbor cell list and the result of the signal quality reported from the terminal 200, and commands the terminal 200 to perform the handover to the target cell. Generally, reference signal received powers (RSRPs) or reference signal received qualities (RSRQs) of the serving cell and the neighbor cell are used in order to determine the handover.

As shown in FIG. 1, a propagation area of the serving base station 110 and a propagation area of the neighbor base station 120 are set to A and B, respectively, and the terminal 200 moves from a position P toward the propagation area of the neighbor base station 120.

Figure 2:
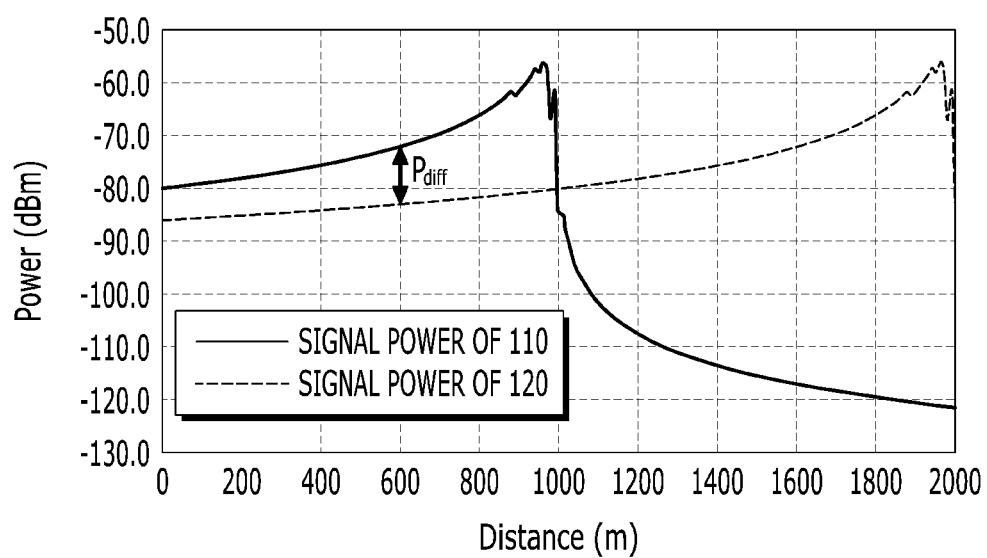
FIG. 2 is a view showing signal powers of a serving base station and a neighbor base station measured by a terminal in the cell configuration shown in FIG. 1.

In the case as described above, signal power of the serving base station 110 and signal power of the neighbor base station 120 measured in the terminal 200 may be represented as shown in FIG. 2.

FIG. 2 is a view showing signal powers of a serving base station and a neighbor base station measured by a terminal in the cell configuration shown in FIG. 1. In FIG. 2, the signal powers measured by the terminal 200 moving from the position P toward the neighbor base station 120 in a state in which the serving base station 110 is positioned at a point spaced apart from the position P by 1000 m and the neighbor base station 120 is positioned at a point spaced apart from the position P by 2000 m are shown. The signal powers were measured in consideration of pass loss depending on a distance and propagation characteristics at a carrier frequency of 32 GHz, directional gains of 22 dB, a 3 dB beam width of 8°.

As shown in FIG. 2, during a period in which the terminal 200 moves toward the neighbor base station 120, the signal power of the serving base station 110 is gradually increased and then suddenly decreased significantly, and the signal power of the neighbor base station 120 is gradually increased continuously. Therefore, in a process in which the terminal 200 moves from the position P toward the neighbor base station 120, a difference between the signal powers of the two base stations 110 and 120 is rapidly changed from a positive value to a negative value.

In a general cell search, an SIRN of about −6 to −3 dB may be supported. However, in the case of the cell configuration as shown in FIG. 1, before the terminal arrives at the point spaced apart from the position P by 1000 m, the signal power of the serving base station acts as very large interference, such that it is difficult to perform the neighbor cell search. In addition, when the terminal 200 passes through the point spaced apart from the position P by 1000 m, received power of the serving base station 110 is rapidly decreased, such that the neighbor cell is searched, and the terminal 200 starts to perform the handover. However, when the terminal 200 is about to start to perform the handover, communication quality with the serving base station 110 is significantly deteriorated, such that the handover may fail.

The cell configuration as shown in FIG. 1 is more likely to occur in a mobile communication system using a high frequency band of 6 GHz or more than in a mobile communication system using a frequency band of less than 6 GHz. Although the high frequency band of 6 GHz or more may be used for wireless communication, it may be mainly used for wireless communication having low mobility, such as fixed backhaul, near field communication, or the like. Recently, research into a technology of using the high frequency band of 6 GHz or more or a millimeter wave band in backhaul communication for a group moving object having high mobility, such as a subway or a high speed train, has been conducted.

Therefore, in an exemplary embodiment of the present invention, a structure of a synchronization signal in which the neighbor cell may be successfully searched even in the case in which the signal power of the serving base station acts as very large interference depending on the cell configuration is suggested.

Figure 3:
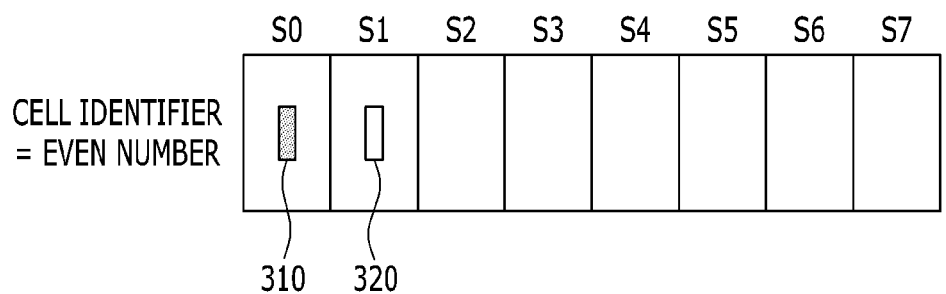
FIGS. 3 and 4 are views showing examples of structures of synchronization signals according to an exemplary embodiment of the present invention.
Figure 4:
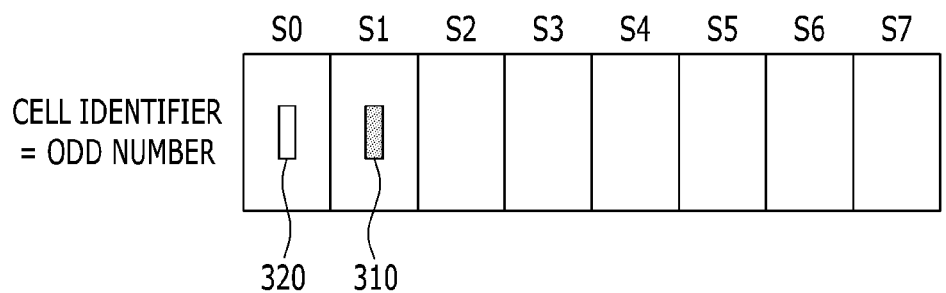

FIGS. 3 and 4 are views showing examples of structures of synchronization signals according to an exemplary embodiment of the present invention.

Referring to FIGS. 3 and 4, in the case in which a period of the synchronization signal consists of a plurality of slots S0 to S7, at least one of the plurality of slots S0 to S7 is used to transmit the synchronization signal, depending on the numbers of serving cell and neighbor cells. A slot that is to be used to transmit the synchronization signal may be determined using a cell identifier and a total number of cells, which is the sum of the numbers of serving cell and neighbor cells. In FIGS. 3 and 4, it has been assumed that eight slots are the period of the synchronization signal.

In the case in which the number of neighbor cells is one, the sum of the numbers of serving cell and neighbor cells is two. Therefore, two of the plurality of slots S0 to S7 are used to transmit the synchronization signal. One of the two slots used to transmit the synchronization signal is a slot in which the synchronization signal is transmitted, and the other thereof is a slot to which a reserved region in which no signal is transmitted is allocated. The number of slots to which the reserved region is allocated is determined depending on the number of neighbor cells.

In a cell configuration in which the number of neighbor cells is one, a structure of a synchronization signal may be divided into a case in which a cell identifier is an even number and a case in which a cell identifier is an odd number. FIG. 3 shows a structure of a synchronization signal in the case in which the cell identifier is the even number, and FIG. 4 shows a structure of a synchronization signal in the case in which the cell identifier is the odd number.

Referring to FIG. 3, in the case in which the cell identifier is the even number, a synchronization signal region 310 is allocated to a first slot S0, and the synchronization signal is transmitted in the synchronization signal region 310 of the first slot S0. In addition, a reserved region 320 is allocated to a position of a second slot S1 corresponding to the synchronization signal region of the first slot S0.

Referring to FIG. 4, in the case in which the cell identifier is the odd number, a synchronization signal has an opposite structure to the structure shown in FIG. 3. That is, the synchronization signal region 310 is allocated to the second slot S1, and the synchronization signal is transmitted in the synchronization signal region 310 of the second slot S1. In addition, the reserved region 320 is allocated to a position of the first slot S0 corresponding to a position of the synchronization signal region 310 of the second slot S1.

Meanwhile, in the case in which the cell identifier is the even number, the synchronization signal may have the structure as shown in FIG. 4, and in the case in which the cell identifier is the odd number, the synchronization signal may have the structure as shown in FIG. 3.

In FIGS. 3 and 4, the slot, which is a unit that is repeated at a predetermined time period, includes a plurality of transmission symbols in a time domain, and includes a plurality of resource blocks in a frequency domain. The resource block includes a plurality of sub-carriers in the frequency domain. The transmission symbol may be called an orthogonal frequency division multiplex (OFDM) symbol, an OFDMA symbol, an SC-FDMA symbol, or the like, depending on a multiple access scheme. The number of transmission symbols included in one slot may be variously changed depending on a channel bandwidth or a length of a cyclic prefix (CP). For example, in the case of a normal CP, one slot includes seven transmission symbols, but in the case of an extended CP, one slot includes six transmission symbols. For example, in a long term evolution (LTE) system, a time length of 0.5 ms is defined as a slot. In the high frequency band of 6 GHz or more, a length of the transmission symbol may be very short, such that a unit of the slot may be differently set. For example, a short time unit such as 100 μs or 250 μs may be used.

Figure 5:
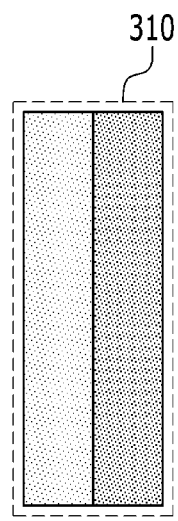
FIG. 5 is a view showing an example of a synchronization signal region according to an exemplary embodiment of the present invention.

FIG. 5 is a view showing an example of a synchronization signal region according to an exemplary embodiment of the present invention.

Referring to FIG. 5, the synchronization signal is transmitted in at least one transmission symbol. That is, the synchronization signal region 310 in which the synchronization signal is transmitted may include at least one transmission symbol. In the LTE system, a primary synchronization signal (PSS) and a secondary synchronization signal (SSS) are defined as the synchronization signal, and the SSS is transmitted in a symbol just before a symbol in which the PSS is transmitted. In FIG. 5, two transmission symbols in which two kinds of synchronization signals are transmitted, respectively, are shown.

Figure 6:
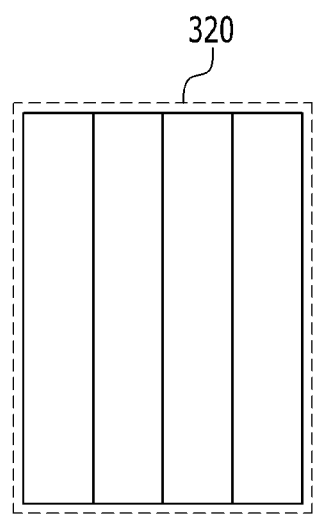
FIG. 6 is a view showing an example of a reserved region according to an exemplary embodiment of the present invention.

FIG. 6 is a view showing an example of a reserved region according to an exemplary embodiment of the present invention.

Referring to FIG. 6, the reserved region 320 includes more transmission symbols than the transmission symbols included in the synchronization signal region 310. The reason why the number of transmission symbols allocated to the reserved region 320 is greater than the number of transmission symbols allocated to the synchronization signal region 310 is to search a synchronization signal of a neighbor cell temporally overlapped with the reserved region 310 of the current serving cell in order to facilitate the search of the neighbor cell.

Figure 7:
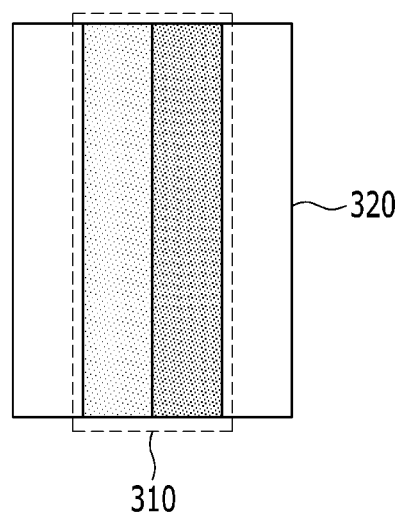
FIGS. 7 to 9 are views showing a synchronization signal region of a neighbor cell temporally overlapped with a reserved region of a serving cell according to an exemplary embodiment of the present invention, respectively.
Figure 8:
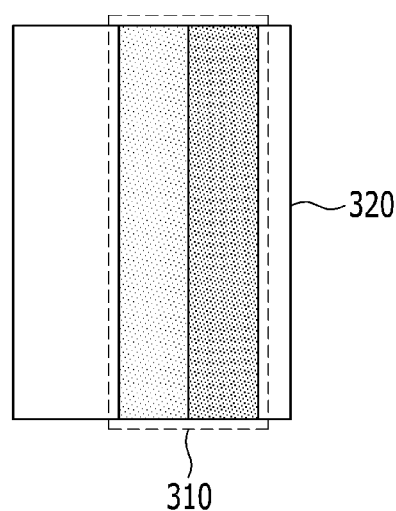
Figure 9:
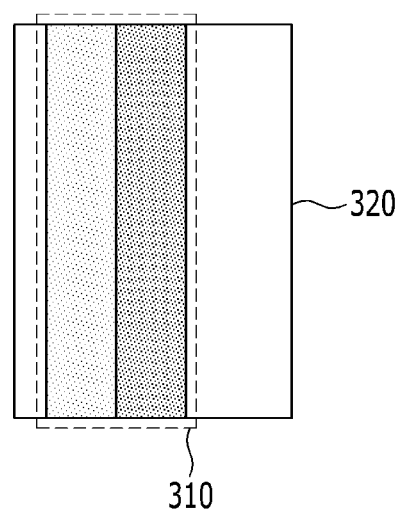

FIGS. 7 to 9 are views showing a synchronization signal region of a neighbor cell temporally overlapped with a reserved region of a serving cell according to an exemplary embodiment of the present invention, respectively.

In the case in which it is assumed that a difference between a frame starting time of the serving cell to which the terminal 200 belongs and a frame staring time of the neighbor cell is $T_{offset}$, when $T_{offset}=0$, the synchronization signal region 310 of the neighbor cell is positioned at the center of the reserved region 320 of the serving cell, as shown in FIG. 7.

Meanwhile, in the case in which $T_{offset}$ is larger than 0 and is smaller than $T_{symb}$ corresponding to a length of the transmission symbol, the synchronization signal region 310 of the neighbor cell is temporally biased rearward in the reserved region 320 of the serving cell, as shown in FIG. 8.

To the contrary, in the case in which $T_{offset}$ is smaller than 0 and is larger than $-T_{symb}$, the synchronization signal region 310 of the neighbor cell is temporally biased forward in the reserved region 320 of the serving cell, as shown in FIG. 9.

A case of FIGS. 8 and 9 includes an assumption that $|T_{offset}|$ is not larger than $|T_{symb}|$. When a case in which $|T_{offset}|$ is larger than $|T_{symb}|$ occurs, a larger number of transmission symbols are allocated to the reserved region 320, thereby making it possible to remove an influence of interference by the serving cell. However, since an increase in the number of transmission symbols of the reserved region 320 means a decrease in a data region, data transmission efficiency is deteriorated. Therefore, a size of the reserved region 320 may be determined in consideration of neighbor cell searching performance and the data transmission efficiency.

Meanwhile, the structures of the synchronization signals shown in FIGS. 3 and 4 correspond to the case in which the number of neighbor cells is one. Hereinafter, structures of synchronization signals in the case in which the number of neighbor cells is two or more will be described with reference to FIGS. 10 and 11.

Figure 10:
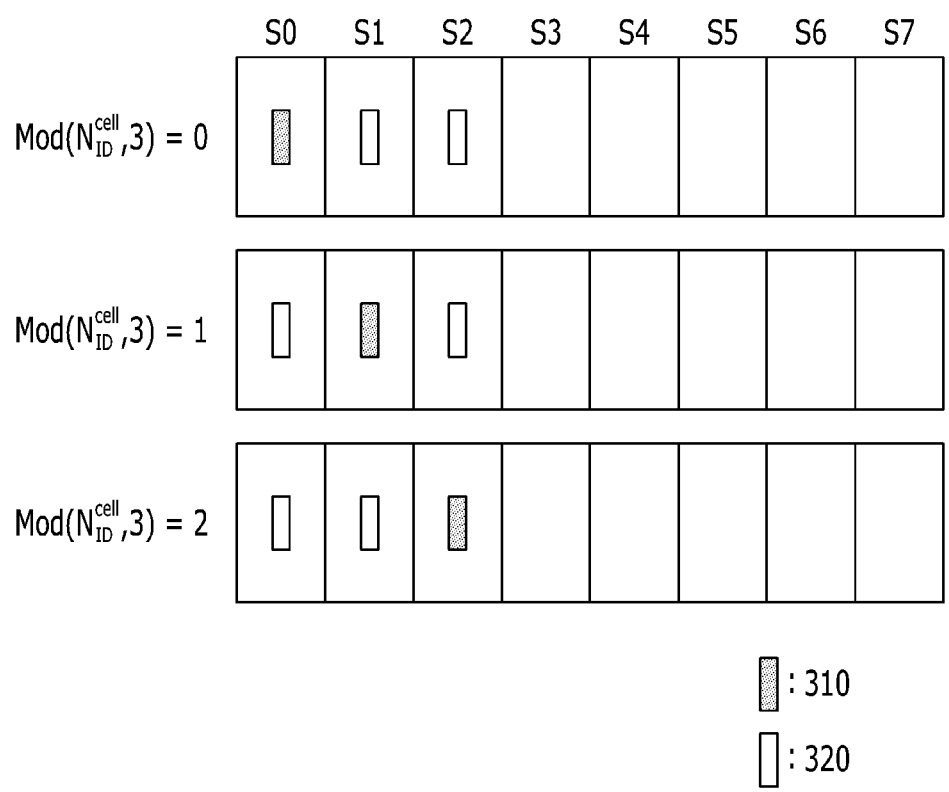
FIGS. 10 and 11 are views showing examples of structures of synchronization signals according to another exemplary embodiment of the present invention.
Figure 11:
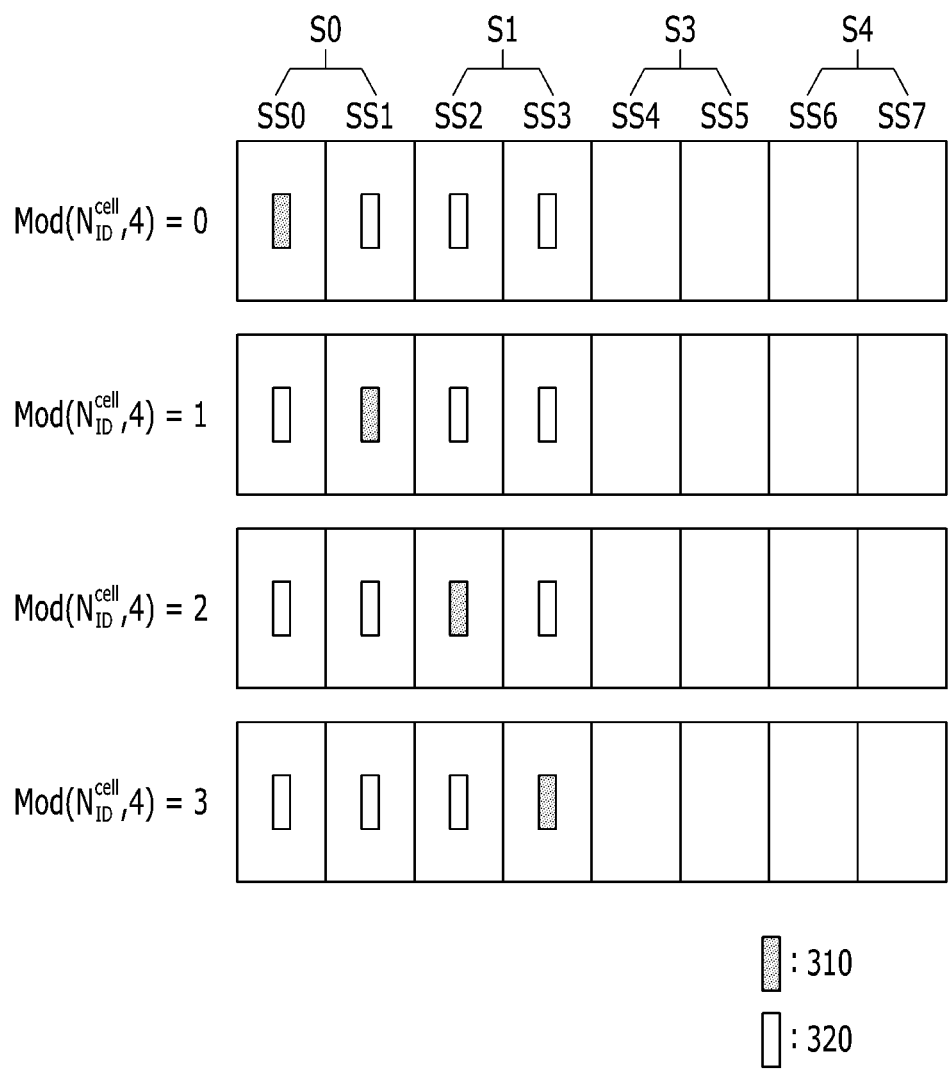

FIGS. 10 and 11 are views showing examples of structures of synchronization signals according to another exemplary embodiment of the present invention. FIG. 10 shows a structure of a synchronization signal in the case in which the number of neighbor cells is two, and FIG. 11 shows a structure of a synchronization signal in the case in which the number of neighbor cells is three.

As shown in FIGS. 10 and 11, the number of slots in which the reserved region is set is determined.

Referring to FIG. 10, in the case in which the number of neighbor cells is two, the number of slots in which the reserved region is set is two. In addition, three slots are used in order to transmit the synchronization signal, depending on a total number of cells, which is the sum of the numbers of serving cell and neighbor cells. In addition, a slot to which the synchronization signal region is to be allocated among the three slots is determined depending on a cell identifier $N_{ID}^{cell}$ and the total number of cells. For example, a slot in which the synchronization signal is to be transmitted may be determined depending on a result value obtained by performing modular arithmetic on the cell identifier $N_{ID}^{cell}$ by the total number of cells.

In the case in which the result value obtained by performing the modular arithmetic on the cell identifier $[N_{ID}^{cell}]$ by 3, which is the total number of cells, is 0, the synchronization signal region 310 is allocated to the first slot S0, and the reserved region 320 is allocated to positions of the second slot S1 and the third slot S2 corresponding to the position of the synchronization signal region 310. In the case in which the result value obtained by performing the modular arithmetic on the cell identifier [$N_{ID}^{cell}$] by 3 is 1, the synchronization signal region 310 is allocated to the second slot S1, and the reserved region 320 is allocated to positions of the first slot S0 and the third slot S2 corresponding to the position of the synchronization signal region 310. In addition, in the case in which the result value obtained by performing the modular arithmetic on the cell identifier [$N_{ID}^{cell}$] by 3 is 2, the synchronization signal region 310 is allocated to the third slot S2, and the reserved region 320 is allocated to positions of the first slot S0 and the second slot S1 corresponding to the position of the synchronization signal region 310. DeletedTexts $N_{ID}^{cell}$ In this way, the slot to which the reserved region is allocated may be determined depending on the number of neighbor cells, and the slot to which the synchronization signal region is allocated may be determined using the cell identifier and the total number of cells, which is the sum of the numbers of serving cell and neighboring cells.

In this way, since all the slots may be allocated to a downlink in a frequency division duplexing (FDD) scheme in which the downlink and an uplink use separate frequency bands, the concept described above may be continuously extended depending on the number of neighbor cells. However, in the case of a time division multiplexing (TDD) scheme, a limitation is generated in a slot region allocated to the uplink and the downlink. In the case of the TDD scheme, for the purpose of the structure of the synchronization signal, two slots may be possible, but three or more slots may not be possible, as shown in FIGS. 3 and 4. As described above, in the case in which a limitation is generated in the number of slots used to transmit the synchronization signal, a predetermined number of slots that are to be used to transmit the synchronization signal are sub-divided into a plurality of sub-slots that are the same as each other, and the sub-divided sub-slots may correspond to the slots used for transmit the synchronization signal described with reference to FIGS. 3 and 4.

As shown in FIG. 11, in the case in which the number of neighbor cells is three, the number of sub-slots in which the reserved region is set is three, and the number of sub-slot in which the synchronization signal is transmitted is one. That is, in the case in which the number of neighbor cells is three, the number of sub-slots used to transmit the synchronization signal is four. Here, in the case in which one slot is divided into two sub-slots, the first slot S0 and the second slot S1 may be used to transmit the synchronization signal.

A method of allocating the synchronization signal region 310 and the reserved region 320 to sub-slots SS0 and SS1 of the first slot and sub-slots SS2 and SS3 of the second slot is the same as the method described with reference to FIG. 6. That is, in the case in which the result value obtained by performing the modular arithmetic on the cell identifier [$N_{ID}^{cell}$] by 4, which is the total number of cells, is 0, the synchronization signal region 310 is allocated to a first sub-slot SS0, and the reserved region 320 is allocated to each position of second to fourth sub-slots SS1 to SS3 corresponding to the position of the synchronization signal region 310. In the case in which the result value cell obtained by performing the modular arithmetic on the cell identifier [$N_{ID}^{cell}$] by 4 is 1, the synchronization signal region 310 is allocated to the second sub-slot SS1, and the reserved region 320 is allocated to each position of the first, third, and fourth sub-slots SS0, SS2, and SS3 corresponding to the position of the synchronization signal region 310. In the case in which the result value obtained by performing the modular arithmetic on the cell identifier [$N_{ID}^{cell}$] by 4 is 2, the synchronization signal region 310 is allocated to the third sub-slot SS2, and the reserved region 320 is allocated to each position of the first, second, and fourth sub-slots SS0, SS1, and SS3 corresponding to the position of the synchronization signal region 310. In the case in which the result value cell obtained by performing the modular arithmetic on the cell identifier [$N_{ID}^{cell}$] by 4 is 3, the synchronization signal region 310 is allocated to the fourth sub-slot SS3, and the reserved region 320 is allocated to each position of the first to third sub-slots SS0 to SS2 corresponding to the position of the synchronization signal cell region 310. DeletedTexts $N_{ID}^{cell}$ In the structure of the synchronization signal described above, a system in which time synchronization is made between different cells is assumed. A detailed cell configuration is closely associated with a synchronization structure. In the case in which cells simply one-dimensionally stand in a row along a road or a railroad of a train, a case in which the cell identifier is the even number and a case in which the cell identifier is the odd number may be alternately disposed. This cell configuration may accomplish an object of the present invention by selecting the structures of the synchronization signals of FIGS. 3 and 4. That is, a terminal belonging to a serving cell having an even cell identifier may easily search a neighbor cell having a successive odd cell identifier. A terminal belonging to a serving cell having an odd cell identifier may easily search a neighbor cell having a successive even cell identifier. Meanwhile, even though the base stations one-dimensionally stand in a row, they may have two sectors directed in opposite directions. Also in this case, the structures of the synchronization signals of FIGS. 3 and 4 may be applied.

Figure 12:
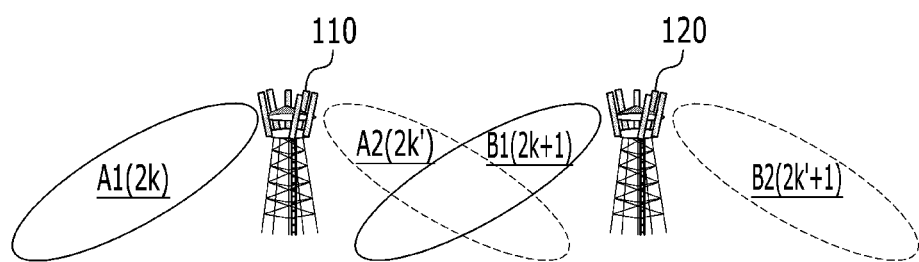
FIGS. 12 to 14 are views showing a cell configuration according to another exemplary embodiment of the present invention, respectively.
Figure 13:
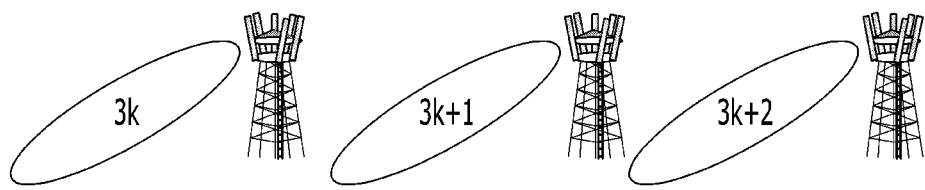
Figure 14:
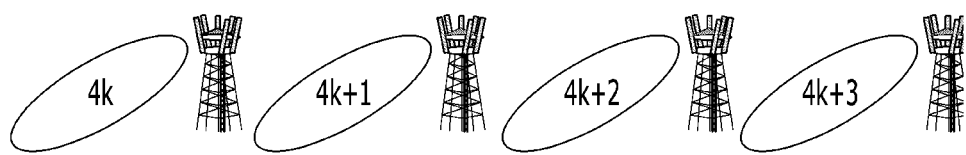

FIGS. 12 to 14 are views showing a cell configuration according to another exemplary embodiment of the present invention, respectively.

Referring to FIG. 12, a cell is formed in one direction at a position of one base station 110, and base stations 110/120 may include two sectors A1 and A2/B1 and B2 directed in opposite directions. Cell identifiers that are an even number or an odd number and have different values are allocated to the sectors A1 and A2/B1 and B2 belonging to the same base stations 110/120. In addition, odd and even cell identifiers are mutually exclusively allocated to sectors of neighboring cells. For example, even different cell identifiers 2*k* and 2*k'* are allocated to two sectors A1 and A2 of the base station 110, and odd different cell identifiers 2*k*+1 and 2*k'*+1 are allocated to two sectors of the base station. In this case, the identifiers 2*k* and 2*k*+1 of the two sectors of the neighboring cells become the even number and the odd number, respectively. In this cell configuration, the terminal moving in a right direction or a left direction performs communication using a cell in directions facing each other as the serving cell, and may use the structures of the synchronization signals of FIGS. 3 and 4.

In addition, the structure of the synchronization signal as shown in FIG. 10 may be used in a cell configuration in which cells are formed in one direction and cell identifiers are allocated as 3*k*, 3*k*+1, and 3K+2, as shown in FIG. 13, and the structure of the synchronization signal as shown in FIG. 11 may be used in a cell configuration in which cell identifiers are allocated as 4*k*, 4*k*+1, 4*k*+2 and 4*k*+3, as shown in FIG. 14.

When the base stations transmit the synchronization signals in this way, since a cell search apparatus of the terminal is in a state in which it has already secured information on the serving cell at the time of performing a neighbor cell search, it recognizes a frame starting point of the serving cell and a position of a slot at which the synchronization signal of the serving cell is positioned. Therefore, when the neighbor cell is searched, a cross-correction value or a value corresponding to a detection metric corresponding to an out of a window in which the synchronization signal region of the neighbor cell is predicted is excluded, thereby making it possible to improve performance and decrease implementation complexity.

In addition, the structure of the synchronization signal according to an exemplary embodiment of the present invention may also be easily used at the time of performing a handover. In the case in which a power level difference between the serving cell and the neighbor cell is large, it is difficult to measure an RSRP or an RSRQ using a reference signal of the neighbor cell. However, when the structure of the synchronization signal according to an exemplary embodiment of the present invention is used, a signal quality of the neighbor cell may be easily measured using the synchronization signal of the neighbor cell. Therefore, in the case in which a power level of the serving cell is much larger than that of the neighbor cell, the signal quality measured using the synchronization signal may be used instead of the RSRP or the RSRQ as a reference for determining the handover. Alternatively, both of the RSRP or the RSRQ measured using a reference signal and the signal quality measured using the synchronization signal may be used as the reference for determining the handover. As described above, the signal quality measured using the synchronization signal as well as the RSRP or the RSRQ measured using the reference signal may become easy parameters in determining the handover.

Figure 15:
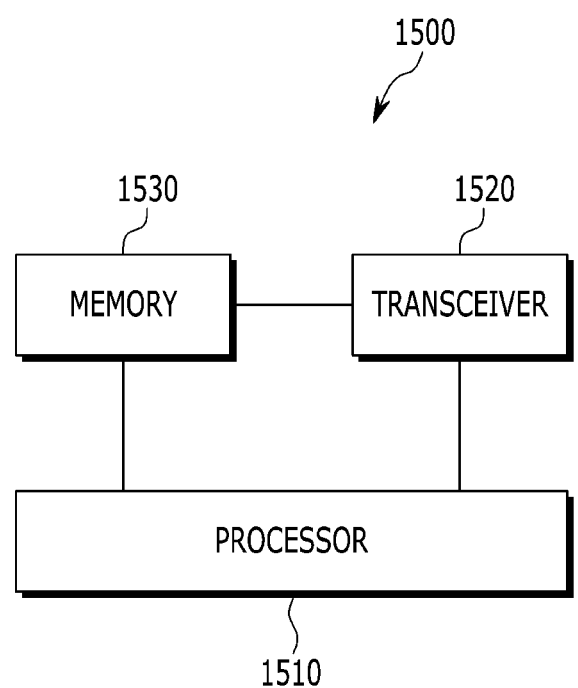
FIG. 15 is a view showing an apparatus for transmitting a synchronization signal according to an exemplary embodiment of the present invention.

FIG. 15 is a view showing an apparatus for transmitting a synchronization signal according to an exemplary embodiment of the present invention.

Referring to FIG. 15, the apparatus 1500 for transmitting a synchronization signal includes a processor 1510, a transceiver 1520, and a memory 1530. The apparatus 1500 for transmitting a synchronization signal may be implemented in the base stations 110 and 120.

The processor 1510 determines slots that are to be used to transmit the synchronization signal among a plurality of slots in a period of one synchronization signal, and determines a slot to which a synchronization signal region is to be allocated and a slot to which a reserved region is to be allocated among the slots that are to be used to transmit the synchronization signal using the cell identifier and the number of neighbor cells. The processor 1510 allocates the synchronization signal region in the corresponding slot depending on the number of synchronization signals used, and allocates the reserved region in the corresponding slot so as to correspond to the synchronization signal region. More transmission symbols may be allocated to the reserved region than to the synchronization signal region, as described with reference to FIGS. 5 and 6.

The transceiver 1520 periodically transmits the synchronization signal to the terminal in the allocated synchronization signal region. The transceiver 1520 may receive a neighbor cell list and signal quality information from the terminal.

The memory 1530 stores instructions that are to be executed in the processor 1510 therein or loads instructions from a storage device (not shown) and temporarily stores the loaded instructions therein, and the processor 1510 may execute the instructions stored or loaded in the memory 1530.

The processor 1510 and the memory 1530 are connected to each other through a bus (not shown), and input and output interfaces (not shown) may also be connected to the bus. Here, the transceiver 1520 may be connected to the input and output interfaces, and peripheral devices such as an input device, a display, a speaker, a storage device, and the like, may be connected to the input and output interfaces.

According to an exemplary embodiment of the present invention, the neighbor cell may be stably searched even in the case in which a signal power of the serving cell acts as very large interference, and performance of the neighbor cell search may be improved even in a state in which the signal power of the serving cell is similar to that of the neighbor cell. Therefore, the method and apparatus for transmitting a synchronization signal according to an exemplary embodiment of the present invention may be applied to existing cellular mobile communication.

Furthermore, the apparatus for transmitting a synchronization signal according to an exemplary embodiment of the present invention enables stable performance of the neighbor cell search even in the case of a mobile communication system having a one-dimensional cell configuration such as a subway or a train and using the high frequency band of 6 GHz or more.

The exemplary embodiments of the present invention described above are not implemented through only the apparatus and/or the method described above, but may also be implemented through programs executing functions corresponding to configurations of the exemplary embodiments of the present invention, a recording medium in which the programs are recorded, and the like. In addition, these implementations may be easily made by those skilled in the art to which the present invention pertains from the exemplary embodiments described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a synchronization signal by a serving cell in a mobile communication system, comprising:

configuring a synchronization signal region for a first synchronization signal from the serving cell and a reserved region for a second synchronization signal from a neighbor cell, wherein the synchronization signal region is allocated in a first time duration, the reserved region is allocated in a second time duration different from the first time duration, and a position of the reserved region in the second time duration corresponds to a position of the synchronization signal region in the first time duration;

transmitting the first synchronization signal through the synchronization signal region to a terminal belonging to the serving cell; and transmitting no signal through the reserved region to the terminal, wherein the reserved region is for the terminal to receive the second synchronization signal from the neighbor cell, and wherein time length of the reserved region is longer than time length of the synchronization signal region.

2. The method for transmitting a synchronization signal of claim 1, wherein the first time duration corresponds to a third time duration in which a reserved region for the first synchronization signal from the serving cell is deployed, the second time duration corresponds to a fourth time duration in which a synchronization signal region for the second synchronization signal from the neighbor cell is deployed, and the third time duration and the fourth time duration are configured to a terminal which belongs to the neighbor cell.

3. The method for transmitting a synchronization signal of claim 2, wherein order of the first time duration among a plurality of time durations is determined by performing a modulo operation on a cell identifier of the serving cell by a number of neighbor cells plus 1.

4. A method for transmitting a synchronization signal by a serving base station, comprising:
configuring a synchronization signal region for a first synchronization signal from the serving base station and a reserved region in which a terminal served by the serving base station receives a second synchronization signal from a neighbor base station, wherein the synchronization signal region is allocated in a first time duration, the reserved region is allocated in a second time duration different from the first time duration, and a position of the reserved region in the second time duration corresponds to a position of the synchronization signal region in the first time duration;
transmitting the first synchronization signal of the serving base station to the terminal through synchronization signal region; and
transmitting no signal to the terminal through the reserved region,
wherein the reserved region in which a second synchronization signal is transmitted from the neighbor base station includes more consecutive transmission symbols in a time domain than those of the synchronization signal region.

5. The method for transmitting a synchronization signal of claim 4, wherein the first time duration corresponds to a third time duration in which a reserved region for the first synchronization signal from the serving cell is deployed, the second time duration corresponds to a fourth time duration in which a synchronization signal region for the second synchronization signal from the neighbor cell is deployed, and the third time duration and the fourth time duration are configured to a terminal which belongs to the neighbor cell.

6. The method for transmitting a synchronization signal of claim 5, wherein order of the first time duration among a plurality of time durations is determined by performing a modulo operation on a cell identifier of the serving cell by a number of neighbor cells plus 1.

7. A method for receiving a synchronization signal by a terminal in a mobile communication system, comprising:
obtaining information about a synchronization signal region for a first synchronization signal from a Serving cell and a reserved region for a second synchronization signal from a neighbor cell, wherein the synchronization signal region is allocated in a first time duration, the reserved region is allocated in a second time duration different from the first time duration, and a position of the reserved region in the second time duration corresponds to a position of the synchronization signal region in the first time duration;
receiving a first synchronization signal through first synchronization signal region from the serving cell; and
receiving a second synchronization signal through the reserved region from the neighbor cell,
wherein no signal is transmitted through the reserved region from the serving cell and time length of the reserved region is longer, than time length of the synchronization signal region.

* * * * *